United States Patent [19]

Mason et al.

[11] 4,160,790

[45] Jul. 10, 1979

[54] HIGH IMPACT NYLON MOLDING COMPOSITIONS

[75] Inventors: Charles D. Mason, Chatham Township, Morris County; Paul W. Flood, Lake Hopatcong, both of N.J.

[73] Assignee: Allied Chemical Corporation, Morris Township, Morris County, N.J.

[21] Appl. No.: 821,380

[22] Filed: Aug. 3, 1977

[51] Int. Cl.² .............................................. C08L 77/00
[52] U.S. Cl. .................................................... 525/179
[58] Field of Search ................................... 260/857 L

[56] References Cited

U.S. PATENT DOCUMENTS

| | | | |
|---|---|---|---|
| 3,375,219 | 3/1968 | Robb | 260/857 L |
| 3,472,916 | 10/1969 | Anspon | 260/857 L |
| 3,492,367 | 1/1970 | Starkweather | 260/857 L |
| 3,516,961 | 6/1970 | Robb | 260/857 L |
| 3,626,026 | 12/1971 | Fukumure | 260/857 L |
| 3,676,400 | 7/1972 | Kohan | 260/857 L |
| 3,845,163 | 10/1974 | Murch | 260/857 L |
| 3,963,799 | 6/1976 | Starkweather | 260/857 L |

FOREIGN PATENT DOCUMENTS 740501  8/1966  Canada .............................. 260/857 L

*Primary Examiner*—Paul Lieberman
*Attorney, Agent, or Firm*—Robert A. Harman; Jay P. Friedenson

[57] ABSTRACT

Synergistic improvement of nylon-6 or nylon-66 impact resistance by blending, in the melt, with minor proportions of both an ethylene/acrylic acid copolymer and an ethylene/ethyl acrylate copolymer.

4 Claims, No Drawings

HIGH IMPACT NYLON MOLDING COMPOSITIONS

BACKGROUND OF THE INVENTION

This invention relates to the synergistic improvement of nylon molding compositions whereby higher Izod impact resistance is obtained in molded objects prepared from such nylon compositions.

It is known (U.S. Pat. No. 3,388,186 of June 11, 1968 to Kray et al.) that compositions of nylon-6, containing ethylene copolymer having a minor proportion of acrylic or methacrylic acid or alkyl ester thereof as backbone and having grafted polycaproamide side chains, show higher impact resistance than nylon-6 molding compositions not containing the above graft copolymer. The patent shows also lesser improvement in the Izod impact resistance of molded articles wherein nylon-6 is dry blended as major ingredient with an ethylene copolymer containing a minor proportion of such acid or ester as comonomer, and the blended mixture is extruded from the melt. These ethylene copolymers contain between 1 and 20 mol percent of the minor comonomer.

U.S. Pat. No. 3,472,916 of Oct. 14, 1969 to Anspon et al. discloses blends of 70-98% by weight nylon-6 homopolymer with correspondingly 2-30% by weight of ethylene/acrylic or methacrylic alkyl ester copolymer, having improved Izod impact resistance, compared to nylon-6 alone. The alkyl group in the alkyl ester copolymer contains 1-4 carbon atoms and the alkyl ester is from 10 to 60 percent by weight of the copolymer. The copolymer has "highly uniform distribution of the acrylic ester in the copolymer", presumably a random distribution.

U.S. Pat. No. 3,963,799 of June 15, 1976 to Starkweather shows ternary blends of polyamide, polyethylene or copolymer thereof, and a small amount of copolymer having ethylenic backbone and polycaproamide side chains.

French Pat. No. 1,386,563 of issue date Dec. 14, 1964 relates to compositions of 50-99 percent by weight polyamide and the balance an olefin copolymer containing up to 10 mol percent of acid side chains.

SUMMARY OF THE INVENTION

In accordance with the present invention, a synergistic enhancement of Izod impact resistance of molded objects from nylon-6 compositions of the prior art is obtained by utilizing in minor proportions blended with the nylon, both a copolymer of ethylene with a minor proportion in the copolymer of units of acrylic or methacrylic acid and a copolymer of ethylene with minor proportions in the copolymer of units of a $C_1$-$C_4$ alkyl ester of such acid and at weight proportions, between the acid and ester copolymers, from 1 part of acid copolymer: 10 parts ester copolymer up to 10 parts of acid copolymer: 1 part of ester copolymer. In these copolymers the minor comonomer units are randomly distributed in the copolymer molecules.

DESCRIPTION OF THE PREFERRED EMBODIMENTS

In preferred embodiments of the invention, having mechanical properties generally approximating those of standard nylon-6 or nylon-66 and having improved Izod impact resistance, the nylon ingredient amounts to 60-98 percent by weight of the composition, the balance consisting essentially of a copolymer of ethylene with acrylic acid and a copolymer of ethylene with ethyl acrylate. Moreover, these preferred copolymers of ethylene each contains from 1 to 20 mol percent of the said comonomer; more particularly, 3-5 mol percent of acrylic acid monomer in the ethylene/acrylic acid copolymer and 5-10 mol percent of ethyl acrylate in the ethylene/ethyl acrylate copolymer. The preferred copolymers are characterized by melt index in the range of 2-20 g./10 min. as measured by ASTM D-1238 employing a load of 2,160 g. and a temperature of 190° C.

Especially preferred compositions of the invention generally contain about 10-15 weight percent of ethylene copolymers with from 1 part of acid copolymer: 2 parts of ester copolymer up to 2 parts of acid copolymer:1 part of ester copolymer by weight; and generally contain from about 80 to 90 weight percent of nylon-6 or nylon 66 having melt index (ASTM #D-1238, condition "Q", 1000g. load, 235° C.) in the range of 2 to 20 g./10 minutes.

The molding compositions of the invention can contain conventional additives in small amounts such as specifically about 0.1 percent by weight of a metal soap as mold release agent or extrusion aid, and optionally a heat stabilizer such as a stabilizer based on copper. They can also contain plasticizers such as caprolactam monomer and water-extractable oligomers, in amounts preferably not over 15% by weight of the nylon ingredient.

The examples which follow illustrate our invention and set forth the best modes which we have contemplated for carrying out the invention, but are intended as illustrative only and not as limiting.

As indicated in the Examples, different grades of nylon-6 were blended with ethylene/ethyl acrylate ("EEA") and with ethylene/acrylic acid ("EAA") copolymers. The EEA copolymer was that commercially available from Union Carbide under the trademark BAKELITE flexible ethylene copolymer DPD-6169, described as having melt index of 6 g./10 min. and ethyl acrylate content of 18 wgt. percent (about 5.8 mol percent). The EAA copolymer was that commercially available from Dow Chemical as Dow EAA Resin 455, described as having melt index of 5.5 g./10 min. and acrylic acid content of 8 wgt. percent (about 3.3 mol percent).

The nylon and the ethylene copolymers, in the form of pellets, were dry blended and then mixed under shearing action by a single screw extruder in the melt; and extruded as a strand which was cooled and pelleted. The extrusion temperature and times somewhat affect the absolute values of the properties of the compositions. Good results have been obtained at temperatures in the range from 215° to 325° C., especially 275°-300° C.

The resulting compositions were injection molded into test bars.

TABLE 1

The products were tested as shown in the following Table, wherein D1238 and D256 indicate ASTM testing procedures.

| INGREDIENTS | Weight Percent |
| --- | --- |

-continued

| Nylon-6 (wgt. % monomer and oligomer content) | | | | | | | | | |
|---|---|---|---|---|---|---|---|---|---|
| A (max. 0.8) | 100 | 88 | 88 | 88 | | | | | |
| B (4.4) | | | | | 88 | | | | |
| C (8.8) | | | | | | 88 | | | |
| D (max. 2.0) | | | | | | | 86 | | |
| E (max. 2.0) | | | | | | | | 86 | |
| F (max. 2.0) | | | | | | | | | 79 |
| EEA Copolymer | 0 | 12 | 7 | 0 | 7 | 7 | 7 | 12 | 5 |
| EAA Copolymer | 0 | 0 | 5 | 12 | 5 | 5 | 7 | 2 | 16 |
| PROPERTIES | Units as shown in parenthesis | | | | | | | | |
| Melt index D1238, "Q" 1000 g./235° C. (g./10 min.) | 6-8 | 3.7 | 3.0 | 3.0 | 5.0 | 7.7 | 3.7 | 3.8 | — |
| Izod (notched) D256; dry (ft.-lbs/inch notch) | 1 | 1.4 | 2.3 | 1.6 | 2.3 | 3.1 | 2.1 | 2.3 | 1.9 |
| Gardner Drop Wt. Impact (ft-lbs) | (?) | 30 | 92 | 86 | 115 | 124 | 106 | 103 | 57 |

Nylons A, B, C have about 45 milliequivalents each of carboxyl and amino end groups per kg. of polymer; D, E and F have about 45 m. eq. of carboxyl and about 19 m. eq. of amino end groups, and about 26 m. eg. of acetyl terminator per kg. Polymer A has formic acid relative viscosity of about 65-75; polymers D, E and F have about 62-72; polymers B and C have lower values consonant with their higher monomer content.

Results generally similar to those shown in the above Table were obtained for melt index and Izod impact upon substituting, in the formulations with nylon A, an EEA copolymer of similar composition to the above, but having melt index of 20 g./10 min. The results differed significantly in the Gardner Drop Wt. Impact values; which were, for example, 69 ft-lbs. and 3.5 ft-lbs. respectively at EEA, EAA=6% each, and at EEA=12%, EAA=0.

When EAA copolymer of similar composition to the above but having melt index of 9.0 g./10 min. was compared to the above EAA in a formulation like that with nylon D, but containing somewhat less copolymer (EEA—7%, EAA—5%), the Izod impact value found was about 2 and the Gardner Drop Wt. Impact value found was about 80 ft-lbs. Use of EAA as previously (melt index 5.5) in this same formulation gave Izod about 2 and Drop Wt. of 71.

TABLE 2

Typical mechanical properties of the commercial nylon-6 molding polymer, employed in the above formulations as nylon A of Table 1, and comparison with the same properties for nylon A/7% EEA/5% EAA composition in accordance with this invention (Table 1), are shown below.

| | Tensile Properties[1] | | | Flexural Properties[2] | |
|---|---|---|---|---|---|
| | Yield Stress (psi) | Elongation (%) Yield | Elongation (%) Break | Stress (psi) | Modulus (psi × 10⁻⁵) |
| Comm'l Nylon-6 Compsn of | 11,800 | 9 | 200 | 16,400 | 3.95 |
| invention | 10,000 | 5 | 49 | 12,430 | 3.32 |

[1] ASTM Test Method D638
[2] ASTM Test Method D790

By increasing the plasticizer (caprolactam monomer and oligomers) content of the compositions of the invention, the flexural modulus of the resulting plastic can be decreased correspondingly and the elongation at break increased, e.g. to $1.2 \times 10^5$ psi and 245% respectively at 8.8% plasticizer vs. $3.32 \times 10^5$ psi and 40% for straight nylon A, each together with 7% EEA and 5% EAA. At the same time, as seen in Table 1 for nylon A vs. B vs. C, the Izod impact resistance is maintained or improved as plasticizer content increases (up to 8.8%) and the Drop Weight impact resistance increases from 92 through 115 and up to 124 ft. lbs.

TABLE 3

A composition like that of Table 1-D was formulated using commercial nylon-66 molding polymer (DuPont's ZYTEL 101 nylon) and 7 weight percent each of the EEA and EAA copolymers used in Table 1. The following properties, measured as in Tables 1 and 2 above, were recorded:

| | Melt Index | Izod Impact | Gardner Drop Wt. | Flex. Stress | Flex. Mod. |
|---|---|---|---|---|---|
| Nylon-66 with EEA/EAA | 4.0 | 2.3 | 93 | 12,810 | 3.34 |
| Comm'l nylon-66 | | 1.0 | | | 4.10 |

We claim:
1. In a melt-blended composition of nylon-6 or nylon 66, as 60-98 percent by weight of the composition, blended with a copolymer of ethylene containing from 1-20 mol percent in the copolymer of randomly distributed units of acrylic acid or ethyl ester thereof: the improvement which comprises such blend containing both a copolymer of ethylene with such acid and a copolymer of ethylene with such ester at weight proportions, between the acid and ester copolymers, from 2 parts of acid copolymer: 12 parts ester copolymer up to 16 parts of acid copolymer: 5 parts ester copolymer by weight, whereby the notched Izod impact resistance of the composition is higher than for a like composition in which either one of the copolymers is substituted for the said blend of both copolymers.

2. Composition of claim 1 wherein the ethylene/acrylic acid copolymer contains 3 to 5 mol percent of acrylic acid units and the ethylene/ethyl acrylate copolymer contains 5 to 10 mol percent of ethyl acrylate units, and each copolymer has melt index as herein defined in the range of 2 to 20 g./10 min.

3. Composition of claim 2 containing about 10-15 weight percent of ethylene copolymers with from 1 part of acid copolymer: 2 parts of ester copolymer up to 2 parts of acid copolymer: 1 part of ester copolymer by weight; containing from about 80 to 90 weight percent of nylon-6, said nylon-6 having melt index as herein defined in the range of 2 to 20 g./10 minutes; and containing up to 15% by weight, based on the nylon ingredient, of caprolactam monomer and water-extractable oligomers.

4. Compositions of claim 1 wherein the nylon content is 60-90 percent by weight of the composition.

* * * * *